United States Patent
Ootaka (10) Patent No.: US 8,269,512 B2
(45) Date of Patent: Sep. 18, 2012

(54) CAPACITIVE OCCUPANT SENSOR AND CAPACITIVE OCCUPANT DETECTION APPARATUS

(75) Inventor: Kouji Ootaka, Toyohashi (JP)

(73) Assignee: Denso Corporation, Kariya (JP)

( * ) Notice: Subject to any disclaimer, the term of this patent is extended or adjusted under 35 U.S.C. 154(b) by 94 days.

(21) Appl. No.: 12/924,105

(22) Filed: Sep. 21, 2010

(65) Prior Publication Data

US 2011/0074447 A1    Mar. 31, 2011

(30) Foreign Application Priority Data

Sep. 30, 2009    (JP) .................................. 2009-227158

(51) Int. Cl.
  *G01R 27/26*    (2006.01)
(52) U.S. Cl. ........ 324/686; 324/658; 324/679; 324/663; 297/217.3; 297/452.28
(58) Field of Classification Search .................. 324/679, 324/658, 686
  See application file for complete search history.

(56) References Cited

U.S. PATENT DOCUMENTS

| | | | |
|---|---|---|---|
| 4,796,013 A | 1/1989 | Yasuda et al. | |
| 7,545,153 B2 | 6/2009 | Abe | |
| 7,796,017 B2 | 9/2010 | Kiribayashi | |
| 2003/0090376 A1 | 5/2003 | Thompson et al. | |
| 2006/0164254 A1* | 7/2006 | Kamizono et al. ............ | 340/667 |
| 2008/0017625 A1* | 1/2008 | Ito et al. ........................ | 219/202 |

FOREIGN PATENT DOCUMENTS

| | | |
|---|---|---|
| JP | 62-225985 | 10/1987 |
| JP | 11-258354 | 9/1999 |
| JP | 2003-232866 | 8/2003 |
| JP | 2008-111809 | 5/2008 |
| WO | 2004/059343 | 12/2003 |
| WO | WO2009034070 | * 3/2009 |
| WO | WO 2009095340 | * 8/2009 |

* cited by examiner

*Primary Examiner* — Timothy J Dole
*Assistant Examiner* — Son Le
(74) *Attorney, Agent, or Firm* — Harness, Dickey & Pierce, PLC (57) ABSTRACT

A capacitive occupant sensor for detecting an occupant sitting on a seat cushion of a seat of a vehicle includes a capacitive sensor mat, a cushion member, and a floating electrode. The capacitive sensor mat is disposed in the seat cushion and has a surface. The cushion member is disposed on the surface of the capacitive sensor mat. The floating electrode is disposed on an opposite side of the cushion member from the surface of the capacitive sensor mat. A projected area of the floating electrode with respect to the surface is smaller than the surface. The floating electrode is in an electrically-floating state with respect to the capacitive sensor mat. The occupant is detected based on an occupant capacitance between the capacitive sensor mat and the occupant and a floating capacitance between the capacitive sensor mat and the floating electrode.

5 Claims, 11 Drawing Sheets

CAPACITIVE OCCUPANT SENSOR AND CAPACITIVE OCCUPANT DETECTION APPARATUS

CROSS REFERENCE TO RELATED APPLICATIONS

The present application is based on and claims priority to Japanese Patent Application No. 2009-227158 filed on Sep. 30, 2009, the contents of which are incorporated in their entirety herein by reference.

BACKGROUND OF THE INVENTION

1. Field of the Invention

The present invention relates to a capacitive occupant sensor and a capacitive occupant detection apparatus.

2. Description of the Related Art

An occupant detection system is used for detecting a seating state of a seat of a vehicle such as whether an adult sits on the seat or a child sits on the seat.

Japanese Patent No. 3,739,930 discloses an occupant detection system in which a plurality of antenna electrodes is symmetrically arranged in a seat cushion so as be separated from each other. An area opposing the antenna electrodes is different between when an adult sits on the seat and when a child sits on the seat. The occupant detection system compares electric current that flows among the antenna electrodes and a threshold value and thereby determining whether an occupant sitting on the seat is an adult or a child.

The occupant detection system detects electric current that flows in the antenna electrodes in accordance with an opposing area of an occupant and the antenna electrodes. Thus, a difference in outputs from the antenna electrodes becomes small between a case where a small adult corresponding to an AF05 dummy sits on the seat and a case where a large adult corresponding to an AM50 dummy sits on the seat. Therefore, the occupant detection system is difficult to discriminate between a small adult and a large adult.

U.S. Pat. No. 4,796,013 (corresponding to JP-A-62-225985) discloses an occupant detection apparatus in which a sensing electrode is disposed on wadding made of an insulator, as a seat cushion trim cover for providing an outer, cloth of the seat, and the sensing electrode is disposed between the outer cloth and the wadding. The sensing electrode is used as an electrode for a variable capacity capacitor and is electrically coupled with an oscillator. The occupant detection apparatus detects an occupant based on a capacity of the variable capacity capacitor. The occupant detection apparatus is also difficult to discriminate between a small adult and a large adult.

US 2003/0090376 A1 (corresponding to JP-A-2003-232866) discloses an occupant detection system in which an occupant detection sensor is disposed on a sheet-shaped insulator. The occupant detection sensor is coupled with a control device for detecting characteristics and existence of an occupant. The control device detects an occupant based on a signal from the occupant detection sensor. The occupant detection system is also difficult to discriminate between a small adult and a large adult.

SUMMARY OF THE INVENTION

In view of the foregoing problems, it is an object of the present invention to provide a capacitive occupant sensor that can discriminate between a small adult and a large adult. Another object of the present invention is to provide an occupant detection apparatus including the capacitive occupant sensor.

According to a first aspect of the present invention, a capacitive occupant sensor for detecting an occupant sitting on a seat cushion of a seat of a vehicle includes a capacitive sensor mat, a cushion member, and a floating electrode. The capacitive sensor mat is disposed in the seat cushion and has a surface. The cushion member is disposed on the surface of the capacitive sensor mat. The floating electrode is disposed on an opposite side of the cushion member from the surface of the capacitive sensor mat. A projected area of the floating electrode with respect to the surface of the capacitive sensor mat is smaller than the surface of the capacitive sensor mat. The floating electrode is in an electrically-floating state with respect to the capacitive sensor mat. The occupant is detected based on an occupant capacitance between the capacitive sensor mat and the occupant and a floating capacitance between the capacitive sensor mat and the floating electrode.

By using the capacitive occupant sensor, a small adult and a large adult can be discriminated based on the occupant capacitance and the floating capacitance.

According to a second aspect of the present invention, a capacitive occupant detection apparatus includes the capacitive occupant sensor according to the first aspect and an occupant detection device. The capacitive occupant sensor outputs an impedance to the occupant detection device in accordance with the occupant capacitance and the floating capacitance. The occupant detection device stores a first threshold value and a second threshold value larger than the first threshold value. The occupant detection device determines an inflation of an airbag when the impedance is greater than the first threshold value. The occupant detection device determines that the occupant is a small adult when the impedance is between the first threshold value and the second threshold value. The occupant detection device determines that the occupant is a large adult when the impedance is greater than the second threshold value.

The capacitive occupant detection apparatus can discriminate between a small adult and a large adult by comparing the impedance with the first threshold value and the second threshold value.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS

Figure 1:
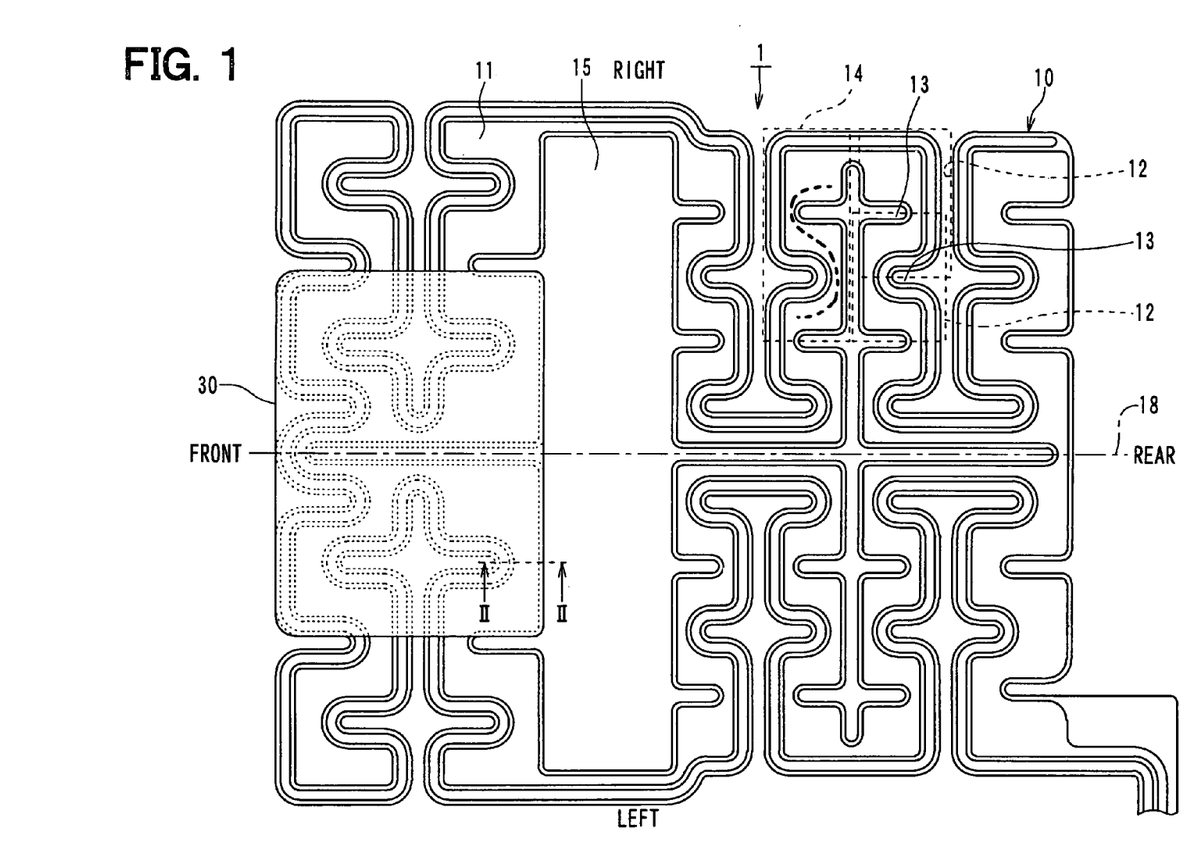
FIG. 1 is a plan view of a capacitive occupant sensor according to an exemplary embodiment of the present invention.

A capacitive occupant sensor 1 according to an exemplary embodiment of the present invention will be described with reference to FIG. 1 and FIG. 2.

The capacitive occupant sensor 1 includes a capacitive sensor mat 10, a cushion member 20, and a floating electrode 30.

The capacitive sensor mat 10 is disposed in a seat cushion of a vehicle seat. The capacitive sensor mat 10 has a surface 11. The capacitive senior mat 10 has a capacitance in accordance with an occupant sitting on the seat cushion. In a plane along the surface 11, the capacitive sensor mat 10 has a plurality of U-shape sections 12 connected each other.

The U-shape sections 1.2 are connected in such a manner that an opening portion 13 of one of the U-shape sections 12 and an opening portion 13 of adjacent one of the U-shape sections 12 in the opposite directions so as to form a S-shape section 14. A plurality of the S-shape sections 14 configurate the capacitive sensor mat 10. The S-shape sections 14 are arrange in a left-right direction of the vehicle and are connected in a front-rear direction of the vehicle. Thus, the S-shape sections 14 meander in the front-rear direction and the left-right direction.

Because a plurality of line sections extending in the front-rear direction or the left-right direction are intermittently arranged, the capacitive sensor mat 10 easily deforms in the directions the line sections are arranged. When an occupant sits on the capacitive sensor mat 10, the capacitive sensor mat 10 is easily warped in the directions the line sections are arranged. Thus, an occupant does not feel that the capacitive sensor mat 10 is difficult to deform, and the vehicle seat in which the capacitive occupant sensor 1 is disposed is comfortable to sit on.

The capacitive sensor mat 10 has a through hole 15 surrounded by the U-shape sections 12. The through hole 15 extends in the left-right direction. In the through hole 15, a wire of a surface cover of the vehicle seat is inserted.

The capacitive sensor mat 10 has a front portion on a front side of the through hole 15 and a rear portion on a rear side of the through hole. A width of the front portion in the left-right direction is larger than a width of the rear portion in the left-right direction because the capacitive sensor mat 10 has a shape corresponding to a shape of the seat cushion whose width in the left-right direction increases from a rear side to a front side.

Figure 2:
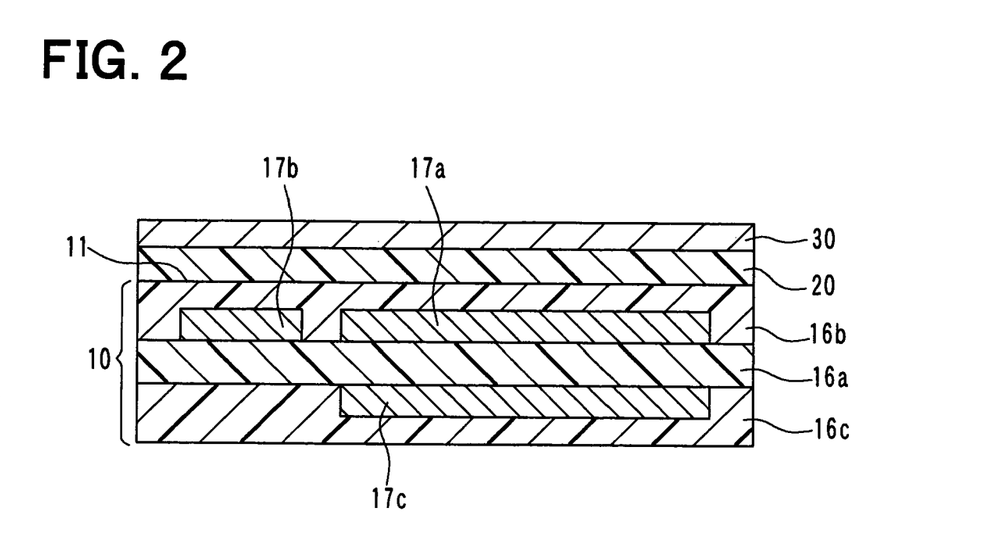
FIG. 2 is a cross-sectional view of a part of the capacitive occupant sensor taken along line II-II in FIG. 1.

As shown, in FIG. 2, the capacitive sensor mat 10 includes a main film 16a, a first electrode 17a, a second electrode 17b, a guard electrode 17c, a cover film 16b, and a resist coat 16c.

Each of the main film 16a and the cover film 16 has a sheet shape and is made of polyethylene terephthalate (PET), which is an electrical insulating material. The main film 16a and the cover film 16 are attached to each other through an adhesive (not shown). The resist coat 16c is formed on the main film 16a by printing.

The first electrode 17a is used for determining whether an occupant sits on the seat of the vehicle. The first electrode 17a is disposed between the main film 16a and a cover film 16b. A planar shape of the first electrode 17a inherits the above-described planar shape of the capacitive sensor mat 10, that is, for example, a planar shape of the main film 16a so as to secure an area of the first electrode 17a.

The second electrode 17b is used for determining whether an occupant sits on the seat and whether the seat is wet. The second electrode 17b is disposed between the main film 16a and the cover film 16b. The second electrode 17b is narrower than the first electrode 17a. As shown in FIG. 2, the second electrode 17b is arranged adjacent to the first electrode 17a and is apart from the first electrode 17a.

The guard electrode 17c is set at the same potential as the first electrode 17a. Thus, the guard electrode 17c can cancel a capacitance between a seat frame in the seat and the first electrode 17a. The guard electrode 17c is disposed between the main film 16a and the resist coat 16c and is opposite to the first electrode 17a. The first electrode 17a and the guard electrode 17c are separated and insulated by the main film 16a.

The first electrode 17a, the second electrode 17b, and the guard electrode 17c may be made of, for example, silver or carbon.

The cushion member 20 is disposed on the surface 11 of the capacitive sensor mat 10. The cushion member 20 has a sheet shape and is made of dielectric material. The cushion member 20 may be made of, for example, urethane foam. Urethane foam has an appropriate hardness such that a thickness of urethane foam is changed by being crushed due to a weight of an occupant.

For example, the cushion member 20 may have the following characteristics.

(1) Material: flexible urethane
(2) Density: 25 kg/m$^3$
(3) Hardness: 117.7 N
(4) Compressive residual distortion: less than or equal to 7%
(5) Repeated compressive residual distortion: less than or equal to 4%

The floating electrode 30 is disposed on the cushion member 20. The floating electrode 30 has a sheet shape and is made of conductive material. The floating electrode 30 has a quadrangular shape in a plane. As shown in FIG. 2, the cushion member 20 is disposed between the floating electrode 30 and the capacitive sensor mat 10. The floating electrode 30 is not electrically coupled with other parts and is in an electrically floating state. That is, the floating electrode 30 is in an electrically-floating state with respect to the capacitive sensor mat 10. The floating electrode 30 may be made of, for example, silver or carbon similarly with the first electrode 17a.

In the present embodiment, the cushion member 20 and the floating electrode 30 have the same planar size. The planar sizes of the cushion member 20 and the floating electrode 30 are smaller than the surface 11 of the capacitive sensor mat 10. The planar sizes mean projected areas of the cushion member 20 and the floating electrode 30 with respect to the surface 11 of the capacitive sensor mat 10. That is, the cushion member 20 and the floating electrode 30 are disposed above a predetermined portion of the surface 11 of the capacitive sensor mat 10. An opposing area of an occupant and the capacitive occupant sensor 1 is different between a case where the occupant is a small adult corresponding to an AF05 dummy and a case where the occupant is a large adult corresponding to an AM50 dummy. The predetermined position is located at a position where the difference is generated.

The surface 11 of the capacitive sensor mat 10 is divided in half in the left-light direction by a center line 18 that extends in the front-rear direction of the vehicle that is perpendicular to the left-right direction. The cushion member 20 and the floating electrode 30 are disposed above the front portion of the surface 11 of the capacitive sensor mat 10 and are disposed above the center line 18. In the present embodiment, a center of each of the cushion member 20 and the floating electrode 30 in the left-right direction is located above the center line 18.

Figure 3A:
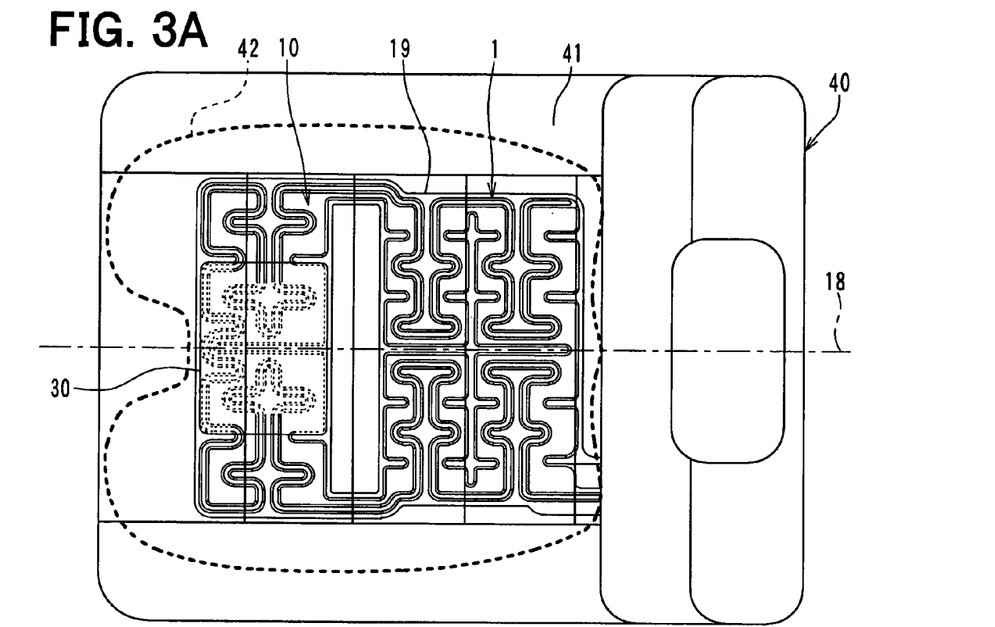
FIG. 3A is a plane view of a seat when a large adult corresponding to an AM50 dummy sits on a seat cushion of the seat.
Figure 3B:
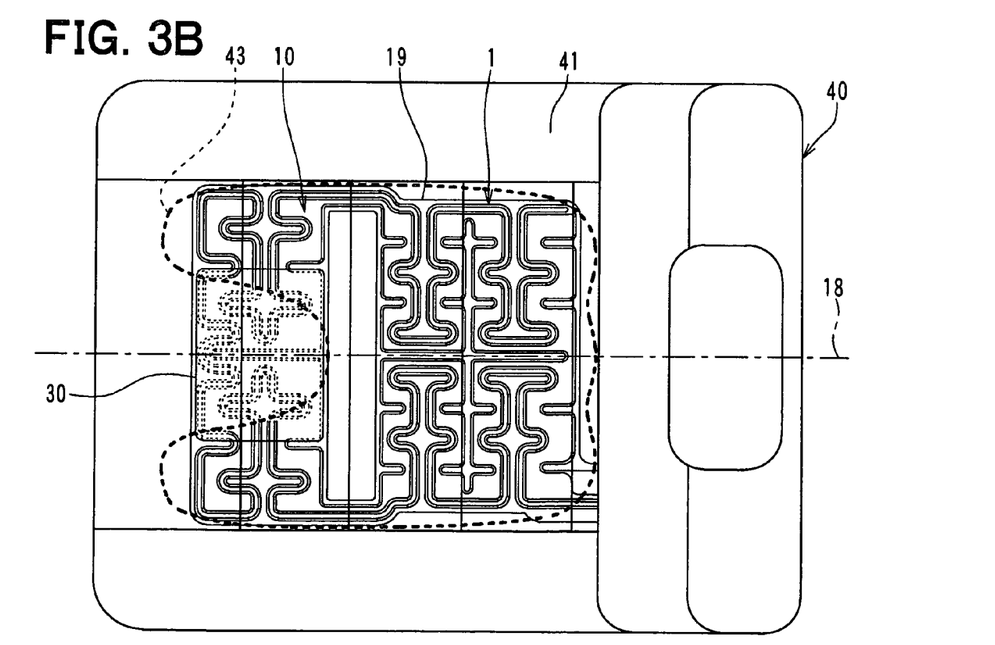
FIG. 3B is a plan view of a seat when a small adult corresponding to an AF05 dummy sits on a seat cushion of the seat.

The reason why the cushion member 20 and the floating electrode 30 are disposed above the surface 11 of the capacitive sensor mat 10 in the above-described manner will be described with reference to FIG. 3A and FIG. 3B. FIG. 3A is a plan view of the seat cushion 41 of the seat 40 when a large adult 42 corresponding to an AM50 dummy sits on the seat cushion 41. FIG. 3B is a plan view of the seat cushion 41 of the seat 40 when a small adult 43 corresponding to an AF05 dummy sits on the seat cushion 41.

The capacitive sensor mat 10 is attached to a urethane pad 19 so that the S-shape sections 14 do not disjoint. The capacitive occupant sensor 1 is disposed in the seat cushion 41 in such a manner that the center line 18 of the capacitive sensor mat 10 is located at a center of the seat 40 in the left-right direction. In the seat cushion 41 of the seat 40, a cushion (not shown), the urethane pad 19, the capacitive sensor mat 10, the cushion member 20, and the floating electrode 30 are disposed in this order from a ground side and are covered with a seat cloth.

In a case where the large adult 42 sits on the capacitive occupant sensor 1, there is a high possibility that a buttock or both thighs of the large adult 42 are put on the floating electrode 30. Thus, as shown in FIG. 3A, the whole area of the floating electrode 30 is covered by the large adult 42.

In a case where the small adult 43 sits on the capacitive occupant sensor 1, there is a low possibility that a buttock or both thighs of the small adult 43 are put on the floating electrode 30. Thus, as shown in FIG. 3B, only edge portion of the floating electrode 30 is covered by the small adult 43. In this way, there is a portion where the opposing area of an occupant and the floating electrode 30 differs in accordance with a physique of an occupant. Thus, the cushion member 20 and the floating electrode 30 are disposed at a portion where a difference in physique of an occupant is subject to be made, that is, above the front portion of the surface 11 of the capacitive sensor mat 10 and above the center line 18.

The capacitive occupant sensor 1 can be used for determining presence of an occupant and determining a type of an occupant based on a capacitance of the capacitive sensor mat 10.

Figure 4:
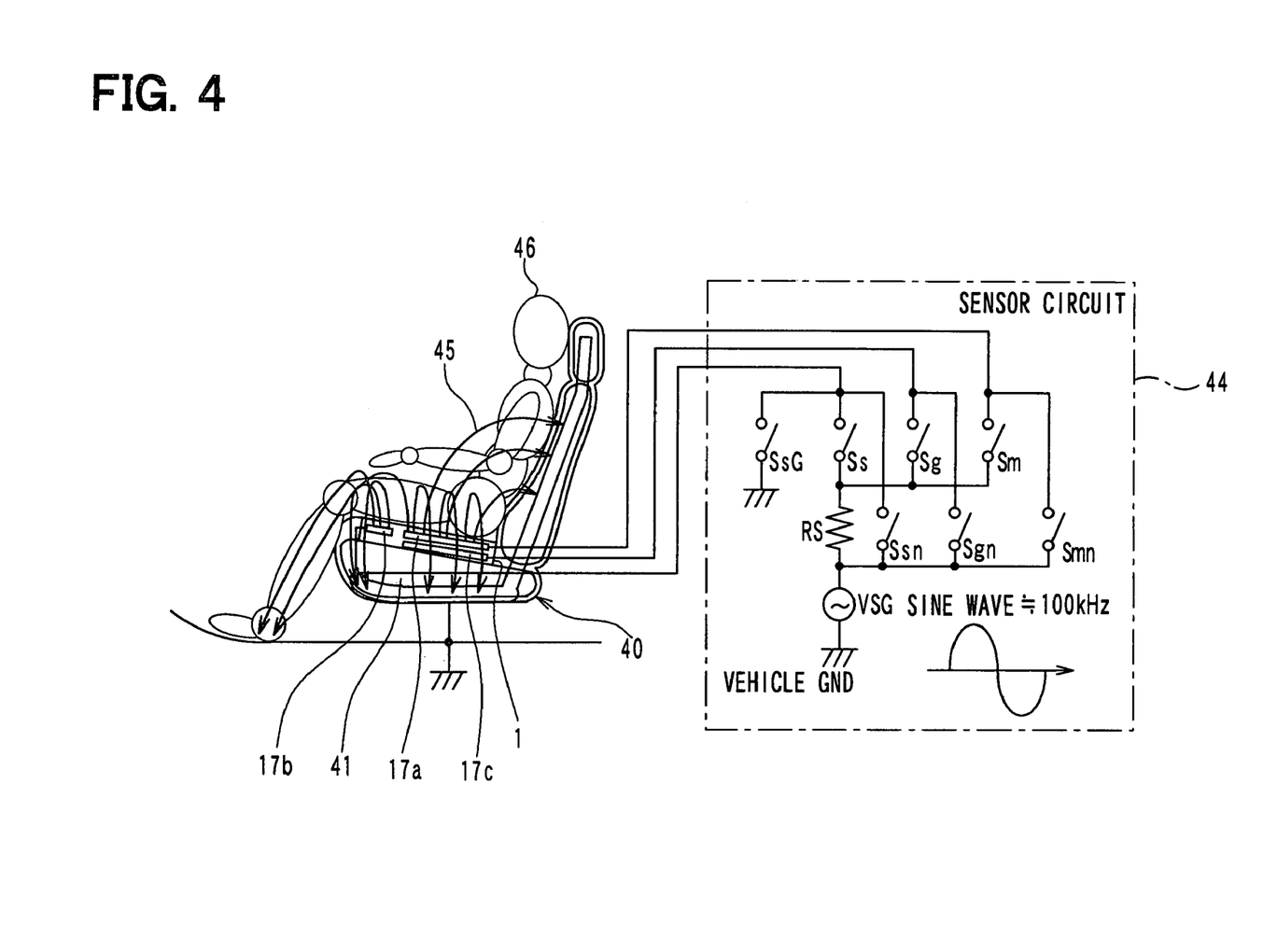
FIG. 4 is a diagram showing an occupant detection system according to an exemplary embodiment of the present invention.

Next, an occupant detection system including the capacitive occupant sensor 1 will be described with reference to FIG. 4. The occupant detection system detects an occupant of a seat based on the capacitance of the capacitive sensor mat 10 and control an inflation of an airbag based on a type of the occupant.

An outline of a measurement of the capacitance will be described. As shown in FIG. 4, the capacitive occupant sensor 1 is disposed in the seat cushion 41 of the seat 40. The capacitive occupant sensor 1 is electrically coupled with a sensor circuit 44 disposed outside the seat 40. By controlling switches SsG, Ss, Sg, Sm, Ssn, Sgn, and Smn in the sensor circuit 44, capacitances are measured with lines of electric force 45 that are generated from the first electrode 17a and the second electrode 17b in the capacitive occupant sensor 1.

The sensor circuit 44 includes a power source VSG and an electric-current detection resistor RS. The power source VSG outputs a sine wave having a frequency of about 100 kHz. The capacitances can be detected based on electric current that flows in the electric-current detection resistor RS. A determination of an occupant 46 is performed mainly based on a capacitance generated between the first electrode 17a and a vehicle ground (GND). A determination of wetness of the seat 40 is performed based on a capacitance generated between the first electrode 17a and the second electrode 17b.

A principle of detecting an occupant and wetness with the capacitive occupant sensor 1 will be described.

Figure 5A:
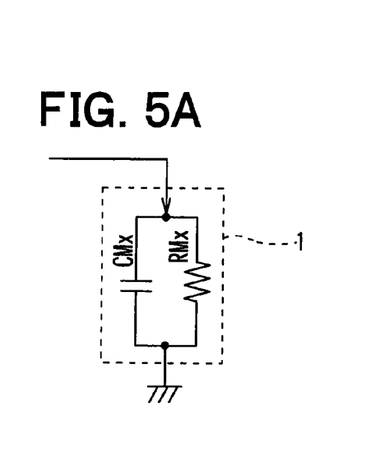
FIG. 5A is an equivalent circuit diagram of a detected object of the capacitive occupant sensor.
Figure 5B:
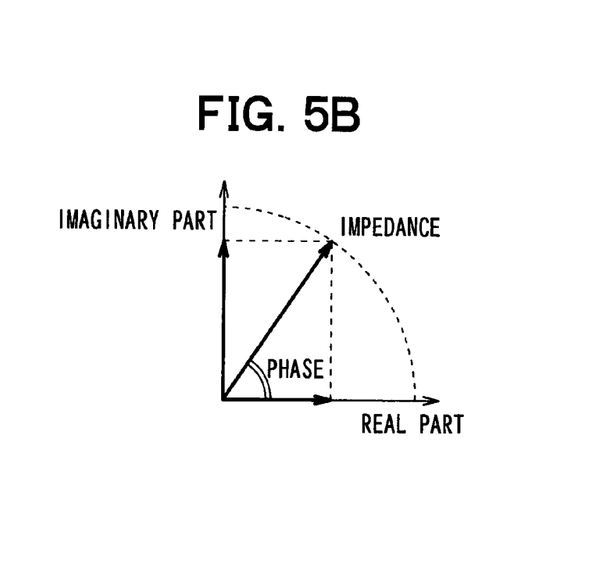
FIG. 5B is a phase diagram of a signal output from the capacitive occupant sensor.

As shown in FIG. 5A, a detected object can be expressed as a parallel circuit of a resistor RMx (real part: conductance) and a capacitor CMx (imaginary part: susceptance). Thus, when the capacitive occupant sensor 1 detects the capacitance, the capacitive occupant sensor 1 actually detects an impedance including a real part and an imaginary part as shown in FIG. 5B. The detected object includes a child restraint system (CRS) in addition to an occupant 46 including an adult and a child.

Figure 6:
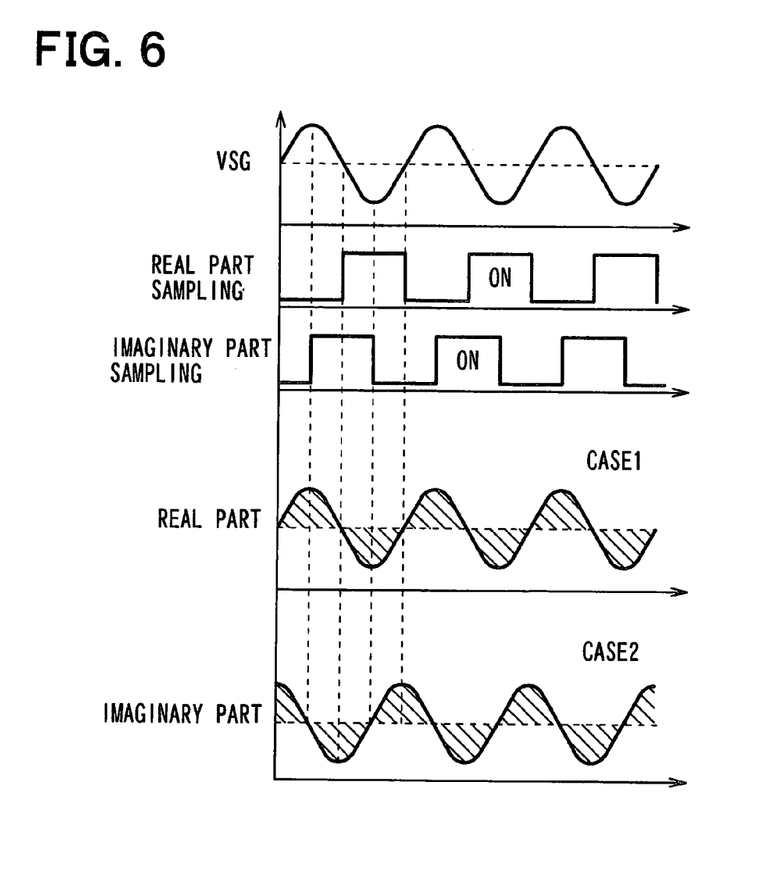
FIG. 6 is a timing diagram of various signals during a measurement by the capacitive occupant sensor.

When the capacitive occupant sensor 1 detects the capacitance, an output signal of the power source VSG, a real part sampling signal, an imaginary part sampling signal, the real part of the impedance, and the imaginary part of the impedance change as shown in FIG. 6. Each signal of the real part and imaginary part of the impedance is a signal obtained by converting electric current that flows in the electric-current detection resistor into voltage.

When the sine wave is applied from the signal source VSG to the electric-current detection resistor RS, a potential difference is generated at the electric-current detection resistor RS in accordance with the impedance of the detected object. In a case where the impedance of the detected object includes only a real part (case 1), a phase-lead element with respect to the signal source. VSG is not included in the potential difference generated at the electric-current detection resistor RS. Thus, when the potential difference generated at the electric-current detection resistor is sampled based on the real-part sampling signal that is the same phase as the signal source VSG, and an output signal depending on only a magnitude of the real part can be detected.

In a case where the impedance of the detected object includes only an imaginary part (case 2), a phase-lead element with respect to the signal source VSG is included in the potential difference generated at the electric-current detection resistor RS. Thus, when the potential difference generated at the electric-current detection resistor is sampled based on the imaginary-part sampling signal that advances 90 degrees with respect to the signal source VSG, an output signal depending on only a magnitude of the imaginary part can be detected.

Because the actual impedance of the detected object includes the real part and the imaginary part, the impedance having a phase as shown in FIG. 5B is detected, and the determination of an occupant and a determination of wetness are performed based on the impedance.

Figure 7:
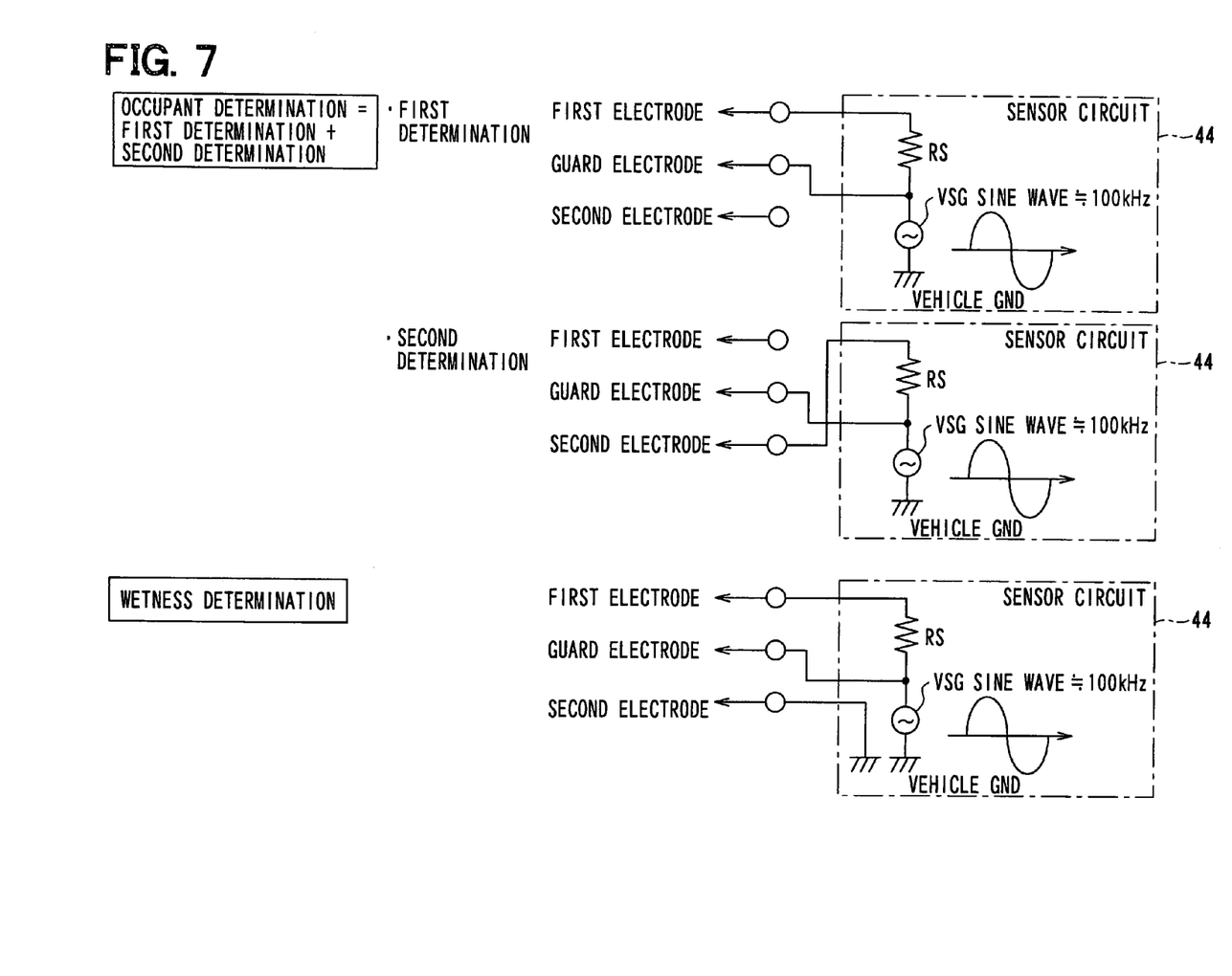
FIG. 7 is a diagram showing a method of measuring impedance for an occupant determination and a wetness determination.

An occupant determination and a wetness determination will be described with reference to FIG. 7. The occupant determination includes a first determination and a second determination. In the first determination, a potential difference between the first electrode 17a and the guard electrode 17c is detected at the electric-current detection resistor RS. In the second determination, a potential difference between the second electrode 17b and the guard electrode 17c is detected at the electric-current detecting resistor RS. The occupant determination is performed based on the sum of the first determination and the second determination. The wetness determination is performed based on a potential difference between the first electrode 17a and the second electrode 17b detected at the electric-current detection resistor RS.

Figure 8:
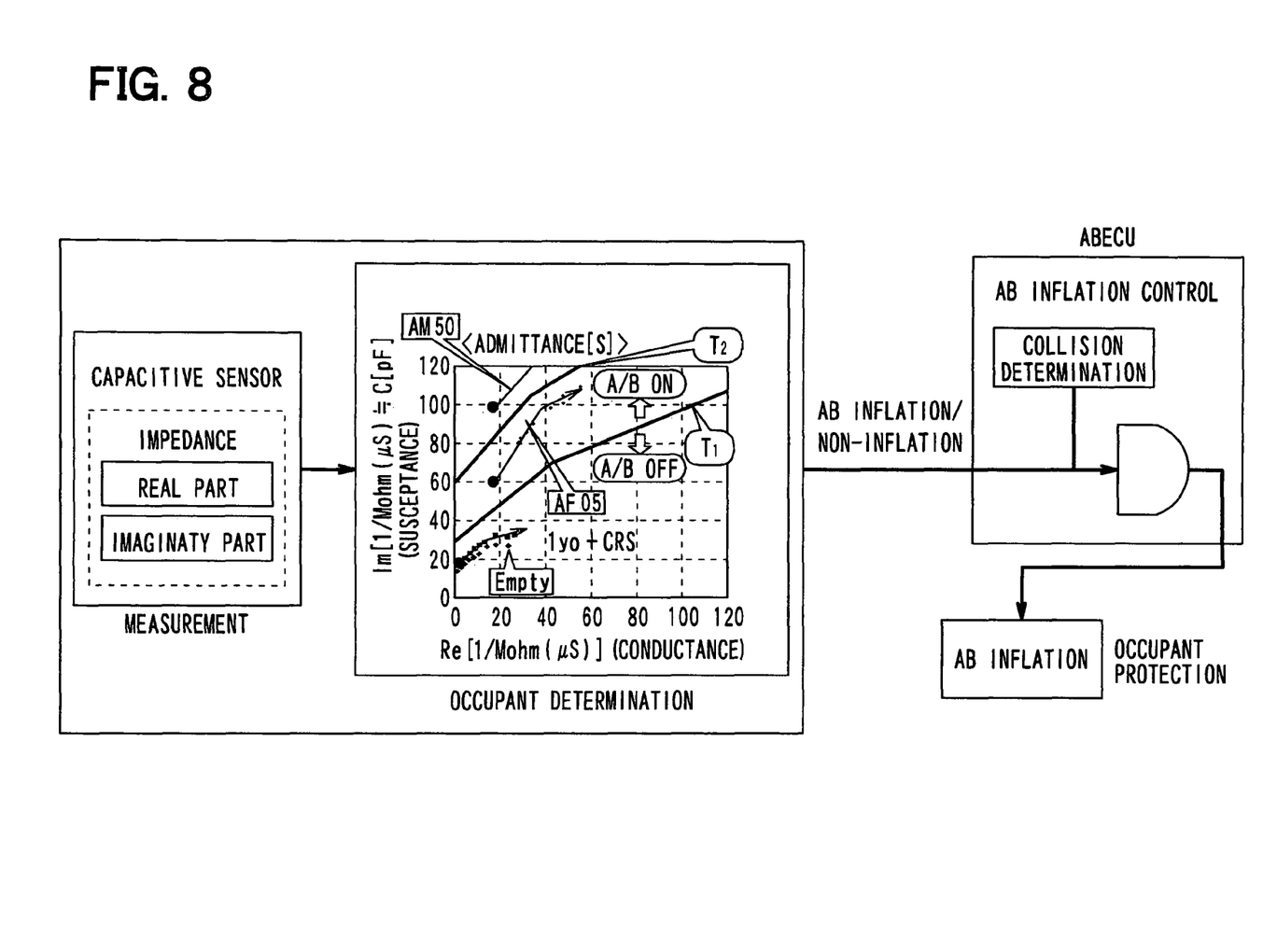
FIG. 8 is a diagram showing a flow of an occupant protection by an occupant detection system according to an exemplary embodiment of the present invention.

An occupant protecting process performed by the occupant detection system will be described with reference to FIG. 8. As described above, the impedance of the detected object is measured with the capacitive occupant sensor (capacitive sensor) 1 and the occupant detection system executes the occupant determination based on the measurement result.

In the occupant determination, the occupant detection system determines whether there is no detected object, that is, the seat is empty, the detected object is a CRS, the detected object is a child, or the detected object is an adult based on the impedance measured with the capacitive occupant sensor 1. Then, a determination of inflation or non-inflation of an airbag is output to an airbag ECU (ABECU).

In the occupant determination, information about physique difference whether an occupant 46 is a small adult 43 or a large adult 42 is also output. The impedance measured with the capacitive occupant sensor 1 is compared with threshold values for determining inflation or non-inflation of the airbag.

In the present embodiment, the impedance measured with the capacitive occupant sensor 1 is compared with a first threshold value $T_1$ and a second threshold value $T_2$. The first threshold value $T_1$ is a threshold value for discriminating between empty or a CRS and a small adult 43. The second threshold value $T_2$ is a threshold value for discriminating between a small adult 43 and a large adult 42.

The first threshold value $T_1$ is a threshold value for determining inflation or non-inflation of the airbag. In the present embodiment, the first threshold value $T_1$ is set in such a manner that the airbag is inflated in a case where a small adult 43 sits on the seat. The second threshold value $T_1$ is a threshold value for controlling an inflation way of the airbag based on physique of the occupant 46. The inflation way includes, for example, an inflation pressure and an inflation timing.

When a one-year child with a CRS (1yo+CRS) sits on the seat or when the seat is empty, the impedance measured with the capacitive occupant sensor 1 is less than the first threshold value $T_1$. Thus, information of non-inflation of the airbag (A/B OFF) is output.

When the impedance measured with the capacitive occupant sensor 1 is between the first threshold value $T_1$ and the second threshold value $T_2$, information of inflation of the airbag (A/B ON) and information that the occupant 46 is the small adult 43 are output. When the impedance measured with the capacitive occupant sensor 1 is larger than the second threshold value $T_2$, information of inflation of the airbag (A/B ON) and information that the occupant 46 is the large adult 42 are output.

The airbag ECU (ABECU) appropriately controls inflation and non-inflation of the airbag based on a collision determination result at a time when the vehicle collides, the determination result of inflation and non-inflation of the airbag, and the physique difference of the occupant. The airbag may be, for example, a passenger seat airbag.

Figure 9:
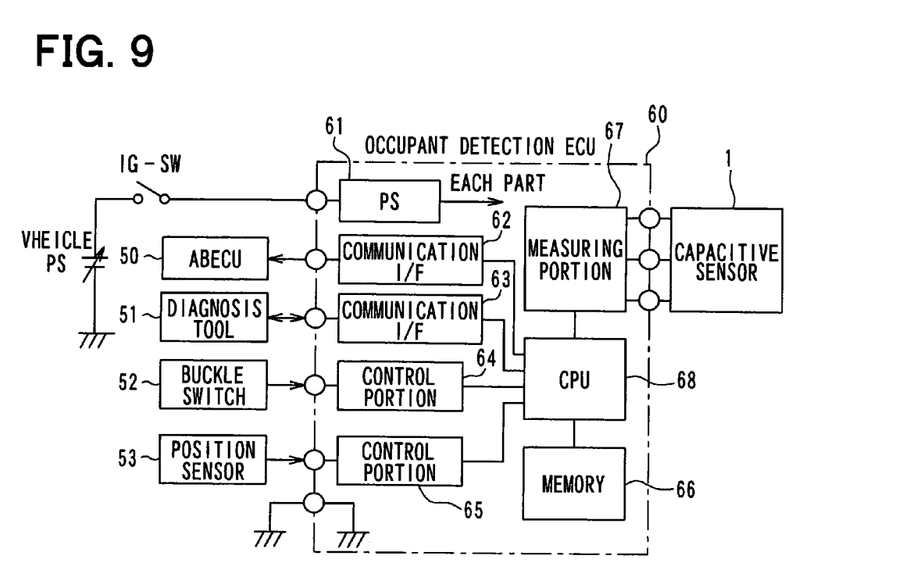
FIG. 9 is a diagram showing the occupant detection system.

A configuration of the occupant detection system will be described with reference to FIG. 9. The occupant detection system includes the capacitive occupant sensor (capacitive sensor) 1, an ABECU 50, a failure diagnosis tool 51, a buckle switch 52, a position sensor 53, and an occupant detection ECU 60.

The ABECU 50 controls inflation and non-inflation of the airbag installed in the vehicle based a signal from the occupant detection ECU 60. The failure diagnosis tool 51 performs a failure diagnosis of the occupant detection ECU 60 by receiving a diagnosis signal from the occupant detection ECU 60.

The buckle switch 52 is disposed in a seat belt buckle for fixing and releasing a tongue plate, that is, a metal part provided at an end of a seat belt. The seat buckle switch 52 detects an engagement of the seat belt buckle and the tongue plate and outputs a signal. The position sensor 53 detects a slide position of the seat 40 that can be slide in the front-rear direction of the vehicle.

The occupant detection ECU 60 receives signals from the capacitive occupant sensor 1 and determines a presence of an occupant 46 and a type of the occupant 46 based on the signal. The occupant detection ECU 60 includes a power source portion (PS) 61, communication interfaces (communication I/F) 62 and 63, control portions 64 and 65, a nonvolatile memory 66, a measuring portion 67, and a central processing unit (CPU) 68.

The power source portion 61 controls electric power supplied from the vehicle power source (vehicle PS) through an ignition switch (IG-SW) to a predetermined value and outputs the controlled electric power to each part of the occupant detection ECU 60. The communication interface 62 is an interface circuit for communicating between the ABECU 50 and the CPU 68. The communication interface 63 is an interface circuit for communicating between the failure diagnosis tool 51 and the CPU 68.

The control portion 64 supplies electric power to the buckle switch 52. In addition, the control portion 64 determines the engagement of the seat belt buckle and the tongue plate based on a signal from the buckle switch 52 and outputs a determination result to the CPU 68. The control portion 65 supplies electric power to the position sensor 53. In addition, the control portion 65 determines a seat position based on a signal from the position sensor 53 and outputs a determination result to the CPU 68.

The nonvolatile memory 66 stores the first threshold value $T_1$ and the second threshold value $T_2$. The nonvolatile memory 66 also stores various data used for the occupant determination and the wetness determination.

The measuring portion 67 measures an impedance of a detected object by the above-described principle. The measuring portion 67 corresponds to the sensor circuit 44 shown in FIG. 4.

Figure 10:
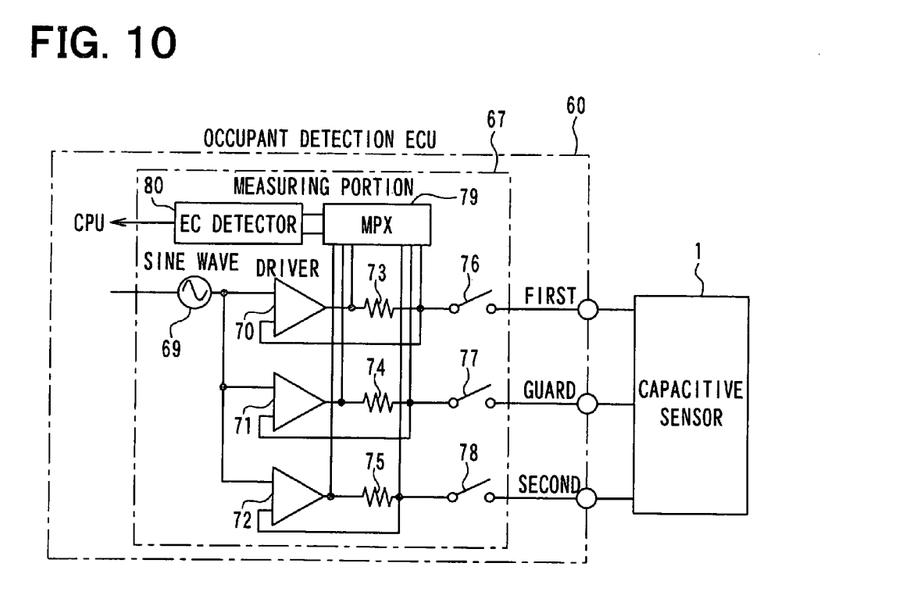
FIG. 10 is a circuit diagram of a measuring portion in the occupant detection system.

As shown in FIG. 10, the measuring portion 67 includes a voltage source 69, drivers 70, 71, 72, electric-current detection resistors 73, 74, 75, switches 76, 77, 78, a multiplexer (MPX) 79, and an electric-current detector (EC detector) 80.

The voltage source 69 receives electric power from the power source portion 61 and generates a sine wave having a predetermined frequency of about 100 kHz. The sine wave output from the voltage source 69 is input to the drivers 70, 71, and 72. The drivers 70, 71, and 72 input the sine wave to the electric-current detection resistors 73, 74, and 75, respectively.

The electric-current detector 80 controls the switches 76, 77, 78 in accordance with the occupant determination or the wetness determination. For example, when the first determination in the occupant determination shown in FIG. 7 is performed, the switches 76 and 77 are turned on and the switch 78 is turned off. When the second determination in the occupant determination shown in FIG. 7 is performed, the switches 77 and 78 are turned on and the switch 76 is turned off. When the wetness determination is performed, all the switches 76, 77, and 78 are turned on.

The multiplexer 79 switches an output of each of the drivers 70, 71, and 72 based on a signal from the electric-current detector 80. In addition, the multiplexer 79 detects electric current that flows in each of the electric-current detection resistors 73, 74, and 75 and outputs the detected result to the electric-current detector 80.

The electric-current detector 80 samples the real part and the imaginary part based on the signal from the multiplexer 79, and thereby measuring the impedance of the detected object. The electric-current detector 80 outputs the measured impedance to the CPU 68.

The CPU 68 receives the signals from the control portions 64 and 65 the nonvolatile, memory 66, and the measuring portion 67 and performs various determinations. The CPU 68 determines a state and a type of the occupant 46 based on the signal output from the buckle switch 52 through the control portion 64, the signal output from the position sensor 53 through the control portion 65, and the signals from the measuring portion 67: The CPU 68 also performs the occupant determination and the wetness determination by comparing the impedances received from the measuring portion 67 with the threshold values stored in the nonvolatile memory 66.

The CPU 68 outputs the determination results to the ABECU 50 through the communication interface 62. The ABECU 50 controls inflation and non-inflation of the airbag based on the determination result of the occupant detection ECU 60. When the CPU 68 receives a request signal from the failure diagnosis tool 51, the CPU 68 outputs a diagnosis signal to the failure diagnosis tool 51 through the communication interface 63. Then, the failure diagnosis tool 51 performs the failure diagnosis of the occupant detection ECU 60.

Effects due to providing the cushion member 20 and the floating electrode 30 in the capacitive occupant sensor 1 will be described with reference to FIG. 11 and FIG. 12A to FIG. 12G.

Figure 11:
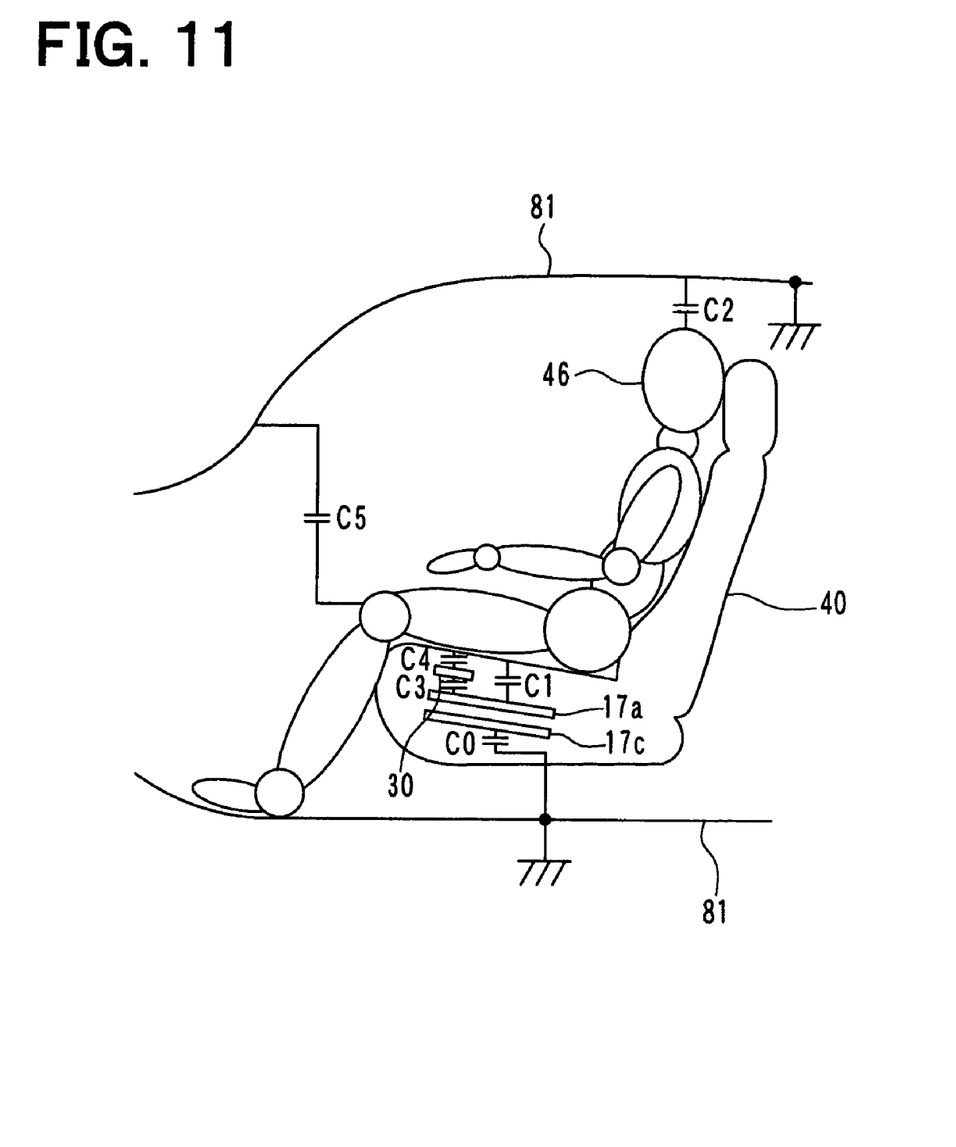
FIG. 11 is a schematic diagram of capacitances generated when an occupant sits on the capacitive occupant sensor shown in FIG. 1.
Figure 12A:
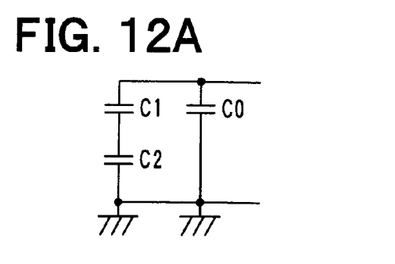
FIG. 12A is an equivalent circuit diagram in a case where a floating electrode and a cushion member are not provided in a capacitive occupant sensor.
Figure 12B:
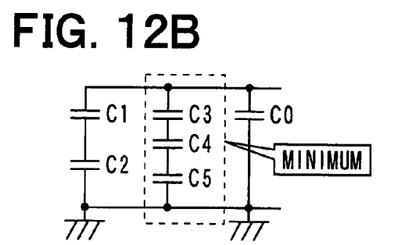
FIG. 12B is an equivalent circuit diagram in a case where a floating electrode and a cushion member are provided in the capacitive occupant sensor and a seat is empty.

FIG. 11 is a schematic diagram of capacitances for the first electrode 17a. FIG. 12A, FIG. 12B, FIG. 12D, and FIG. 12F are equivalent circuit diagrams for the first electrode 17a. When an occupant 46 sits on the capacitive occupant sensor 1, capacitances C1 to C5 are generated as shown in FIG. 11. The equivalent circuit diagram in FIG. 12A is in a case where the floating electrode 30 is not provided in the capacitive occupant sensor 1. The equivalent circuit diagrams in FIG. 12B, FIG. 12D, and FIG. 12F are cases where the floating electrode 30 is provided in the capacitive occupant sensor 1. Effects due to the floating electrode 30 when the first determination in the occupant determination is performed will be described below.

When the cushion member 20 and the floating electrode 30 are not provided in the capacitive occupant sensor 1, as shown in FIG. 12A, the capacitance C0 is generated between the guard electrode 17c and a vehicle body 81. The capacitance C1 is generated between the first electrode 17a (capacitive sensor mat 10) and the occupant 46, and the capacitance C2 is generated between the occupant 46 and the vehicle body 81. Since the capacitance C0 is very small, the occupant detection ECU 60 determines whether the seat 40 is empty, the occupant detection ECU 60 determines the occupant 46 is a small adult 43, or the occupant 46 is a large adult 42 based on the capacitances C1 and C2.

On the other hand, when the cushion member 20 and the floating electrode 30 are provided in the capacitive occupant sensor 1, as shown in FIG. 11, the capacitance C3 is generated between the first electrode 17a (capacitive sensor mat 10) and the floating electrode 30, the capacitance C4 is generated between the floating electrode 30 and the occupant 46, and the capacitance C5 is generated between the occupant 46 and the vehicle body 81 in addition to the capacitances C1 and C2.

That is, by providing the cushion member 20 and the floating electrode 30 in the capacitive occupant sensor 1, the capacitances C3, C4, C5 are generated. Thus, as shown in FIG. 12B, FIG. 12D, and FIG. 12F, the capacitances C3, C4, and C5 are generated in parallel with the capacitances C1 and C2.

When an occupant 46 sits on the capacitive occupant sensor 1, the cushion member 20 is crushed in accordance with a weight of the occupant 46, and a distance between the floating electrode 30 and the first electrode 17a changes.

Figure 12C:
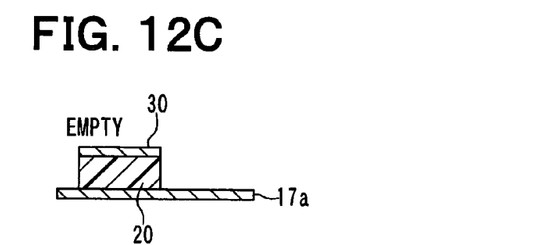
FIG. 12C is a cross-sectional view of a part of the capacitive occupant sensor in the case where the floating electrode and cushion member are provided in the capacitive occupant sensor and the seat is empty.
Figure 12D:
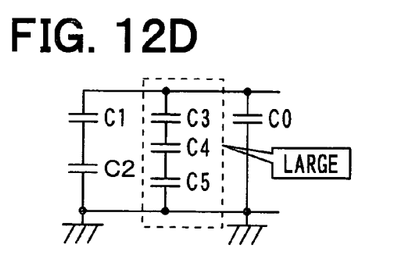
FIG. 12D is an equivalent circuit diagram in a case where the floating electrode and the cushion member are provided in the capacitive occupant sensor and a large adult corresponding to an AM50 dummy sits on the seat.

When the seat 40 is empty, the cushion member 20 is not crushed and the cushion member 20 has the maximum thickness as shown in FIG. 12C. Because the distance between the floating electrode 30 and the first electrode 17a is the maximum, the capacitance C3 becomes the minimum. Thus, a capacitance of a path through the capacitances C3, C4, and C5 becomes the minimum.

Figure 12E:
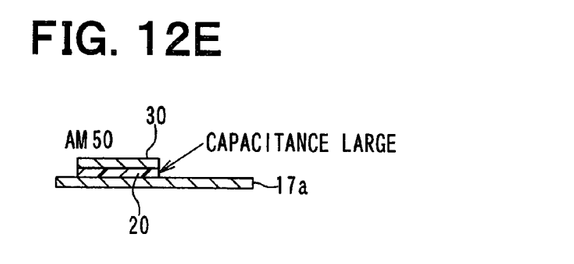
FIG. 12E is a cross-sectional view of a part of the capacitive occupant sensor in the case where the floating electrode and cushion member are provided in the capacitive occupant sensor and the large adult corresponding to the AM50 dummy sits on the seat.
Figure 12F:
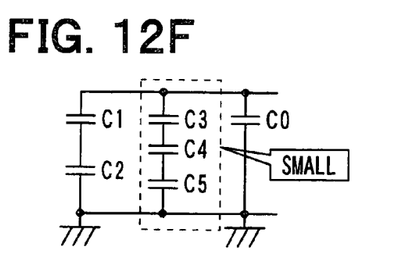
FIG. 12F is an equivalent circuit diagram in a case where the floating electrode and the cushion member are provided in the capacitive occupant sensor and a small adult corresponding to an AF05 dummy sits on the seat.

When a large adult 42 corresponding to an AM50 dummy sits on the seat 40, the cushion member 20 is crushed. Thus, the capacitance C3 between the first electrode 17a and the floating electrode 30 becomes large. As a result, the capacitance of the path through the capacitances C3, C4 and C5 becomes large.

Figure 12G:
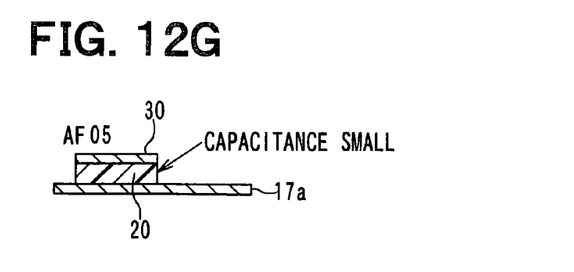
FIG. 12G is a cross-sectional view of a part of the capacitive occupant sensor in the case where the floating electrode and cushion member are provided in the capacitive occupant sensor and the small adult corresponding to the AF05 dummy sits on the seat.

When a small adult 43 corresponding to an AF05 dummy sits on the seat 40, the cushion member 20 is crushed more than when the seat 40 is empty and less than when the large adult 42 sits on the seat 40. Thus, the capacitance C3 between the first electrode 17a and the floating electrode 30 becomes larger than when the seat 40 is empty and smaller than when the large adult 42 sits on the seat 40. As a result, the capacitance of the path through the capacitances C3, C4, and C5 becomes larger than when the seat 40 is empty and smaller than when the large adult 42 sits on the seat 40.

In this way, when a large adult 42 corresponding to an AM50 dummy sits on the seat cushion 41 of the seat 40, the capacitance C3 generated between the floating electrode 30 and the first electrode 17a becomes large. When a small adult 43 corresponding to an AF05 dummy sits on the seat cushion 41 of the seat 40, the capacitance C3 becomes small. This is because the cushion member 20 disposed between the floating electrode 30 and the capacitive sensor mat 10 is crushed, and thereby the distance between the floating electrode 30 and the first electrode 17a changes. The difference in the capacitance C3 is reflected in the impedance measured with the capacitive occupant sensor 1. Thus, the occupant detection ECU 60 can discriminate between a large adult 42 and a small adult 43. As a result, the occupant detection system can appropriately control the inflation way of the airbag, such as the inflation pressure and the inflation timing, based on whether an occupant 46 is large or small.

Although the first determination in the occupant determination is described above, a difference in capacitance due to a crush of the cushion member 20 is reflected in the impedance also when the second determination in the occupant determination using the second electrode 17b is performed.

As described above, in the capacitive occupant sensor 1 according to the present embodiment, the cushion member 20 and the floating electrode 30 are disposed on the surface 11 of the capacitive sensor mat 10. The cushion member 20 disposed between the floating electrode 30 and the capacitive sensor mat 10 is crushed in accordance with the weight of the occupant 46, and the distance between the floating electrode 30 and the capacitive sensor mat 10 including the first electrode 17a and the second electrode 17b changes in accordance with the physique of the occupant 46. Thus, between a large adult 42 and a small adult 43, the difference in capacitance becomes large. That is, the difference in physique can be reflected in the impedance measured with the capacitive occupant sensor 1.

Especially, in the present embodiment, the cushion member 20 and the floating electrode 30 are disposed above the front portion of the surface 11 of the capacitive sensor mat 10 and are disposed above the center line 18 of the capacitive sensor mat 10. When a small adult 43 sits on the capacitive occupant sensor 1, there is a low possibility, that the buttock or both the thighs of the small adult 43 are put on the floating electrode 3 and the cushion member 20 is difficult to be crushed. When a large adult 42 sits on the capacitive occupant sensor 1, there is a high possibility that the buttock or both the thighs of the large adult 42 are put on the floating electrode 30. The difference between the large adult 42 and the small adult 43 remarkably appears in the capacitance, that is, the impedance measured with the capacitive occupant sensor 1. As a result, the large adult 42 and the small adult 43 can be discriminated by comparing the impedance with the second threshold value $T_2$.

The difference between the large adult 42 and the small adult 43 appears in the impedance measured with the capacitive occupant sensor 1 due to the floating electrode 30, and the occupant detection ECU 60 compares the impedance with the second threshold value $T_2$. Thus, the occupant detection ECU 60 can discriminate between the large adult 42 and the small adult 43 with certainty.

In the capacitive occupant sensor 1, the cushion member 20 and the floating electrode 30 are disposed above the surface 11 of the capacitive sensor mat 10. Thus, it is not required to increase the number of electrodes to improve a discrimination performance. Therefore, a structure of the capacitive occupant sensor 1 is not complicated. Because it is not required to increase the number of driving electrodes in a control circuit for controlling the capacitive occupant sensor 1, a structure of the control circuit is not complicated. Therefore, the discrimination performance of the capacitive occupant sensor 1 can be improved without increasing cost.

In the present embodiment, the occupant detection ECU 60 can function as an occupant detection device. The capacitance C1 between the first electrode 17a (capacitive sensor mat 10) and the occupant 46 corresponds to an occupant capacitance. The capacitance C3 between the first electrode 17a (capacitive sensor mat 10) and the floating electrode 30 corresponds to a floating capacitance.

Other Embodiments

Although the present invention has been fully described in connection with the exemplary embodiments thereof with reference to the accompanying drawings, it is to be noted that various changes and modifications will become apparent to those skilled in the art.

For example, the above-described planar structure of the capacitive sensor mat 10 is an example and the capacitive sensor mat 10 may also have other shape. The above-described arrangement of the floating electrode 30 is an example, and the floating electrode 30 may also be arranged in other position. Other examples of planar structures of the capacitive sensor mat 10 and arrangements of the floating electrode 30 will be described with reference to FIG. 13A to FIG. 13D.

Figure 13A:
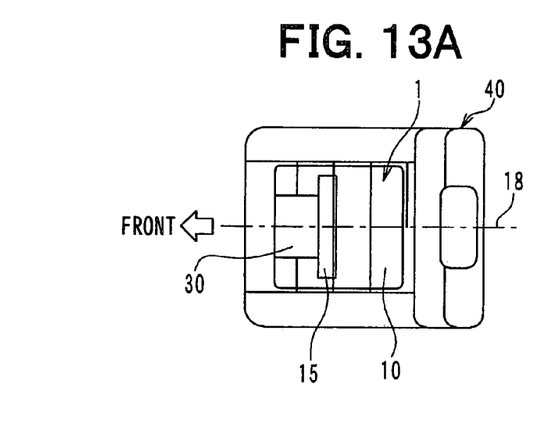
FIG. 13A to FIG. 13D are diagrams showing planar shapes of capacitive sensor mats and arrangements of floating electrodes according other embodiments of the present invention.

In the example shown in FIG. 13A, a capacitive sensor mat 10 has a quadrangular shape, and a width of a front portion of the capacitive sensor mat 10 in the left-right direction is the same as a width of a rear portion. In the example shown in FIG. 1 and the example shown in FIG. 13A, the capacitive sensor mat 10 has one through hole 15. The number of the through hole 15 may also be more than one.

Figure 13B:
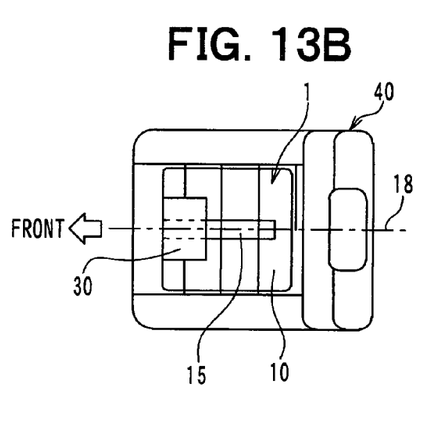

In the example shown in FIG. 13B, a capacitive sensor mat 10 has a through hole 15 extending in the front-rear direction of the vehicle. The through hole 15 is located on the center line 18 that divides the surface 11 of the capacitive sensor mat 10 in half in the left-right direction of the vehicle. Because the through hole 15 is provided in a front portion of the capacitive sensor mat 10, a front end of the capacitive sensor mat 10 has open and the capacitive sensor mat 10 has an approximately U-shape. The cushion member 20 and the floating electrode 30 are disposed above the front portion of the capacitive sensor mat 10 so as to connect the capacitive sensor mat 10 divided by the through hole 15 in the left-light direction. Thus, the cushion member 20 and the floating electrode 30 above the center line 18 are located above the through hole 15.

Figure 13C:
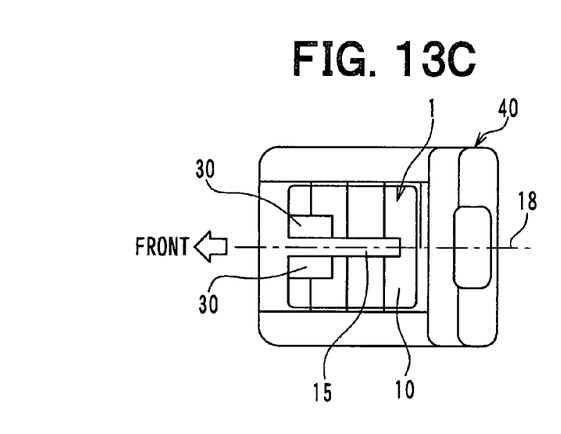

In the example shown in FIG. 13C, a capacitive sensor mat 10 has the same shape as the capacitive sensor mat 10 shown in FIG. 13B. On the sensor mat 10, two sets of the cushion member 20 and the floating electrode 30 are arranged. In this way, the number of the floating electrode 30 may also be more than one. In this case, the cushion members 20 and the floating electrodes 30 are disposed above the surface 11 of the capacitive sensor mat 10 and do not cover the through hole 15. Thus, the cushion members 20 and the floating electrodes 30 are disposed above the front portion of the surface 11 of the capacitive sensor mat 10 and are disposed adjacent to the center line 18. When a plurality of floating electrodes 30 is provided, a difference in capacitance between when an occupant 46 is a small adult 43 and when an occupant 46 is a large adult 42 may increase because the number of floating electrodes 30 covered by the occupant 46 may differ between the small adult 43 and the large adult 42.

In the example shown in FIG. 13C, the two floating electrodes 30 are disposed above different positions of the surface 11 of the capacitive sensor mat 10. The number of the floating electrodes 30 may also be one or more than two.

Figure 13D:
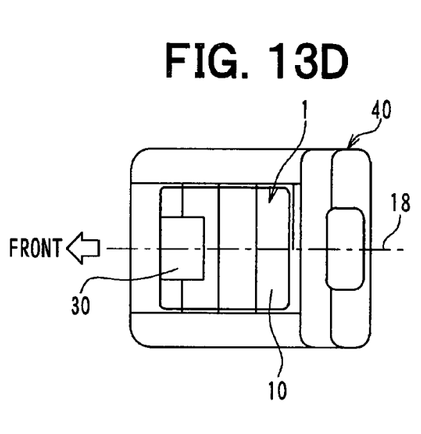

In the example shown in FIG. 13D, a capacitive sensor mat 10 does not have a through hole 15, and a floating electrode 30 is disposed above the capacitive sensor mat 10.

Although the number of the floating electrode 30 provided in the examples shown in FIG. 13A, FIG. 3B and FIG. 13D is one, the number of the floating electrodes 30 may also be more than one.

Even if the planar structure of the capacitive sensor mat 10 or the position and the number of the floating electrode 30 are changed, when an occupant 46 sits on the seat cushion 41, a buttock of the occupant 46 is put on the rear portion of the surface 11 of the capacitive sensor mat 10, and a right thigh and a left thigh are respectively put on a right side and a left side of the front portion of the surface 11 of the capacitive sensor mat 10. The cushion member 20 is difficult to be crushed when the small adult 43 sits on the capacitive occupant sensor 1 and the cushion member 20 is crushed when a large adult 42 sits on the capacitive occupant sensor 1. Thus, the difference between the capacitance detected when a small adult 43 sits on the seat 40 and the capacitance detected when a large adult 42 sits on the seat 40 becomes large and thereby the small adult 43 and the large adult 42 can be discriminated.

In each of the examples shown in FIG. 1 and FIG. 13A to FIG. 13D, the cushion member 20 and the floating electrode 30 have the same size. However, the cushion member 20 and the floating electrode 30 may also have different sizes. For example, the cushion member 20 may also be larger than the floating electrode 30.

In the above-described embodiment and the examples shown in FIG. 13A to FIG. 13D, the planar shape of the floating electrode 30 is a quadrangular shape as an example. The floating electrode 30 may also have other shape. For example, the planar shape of the floating electrode 30 may also be the same as the planar shape of the capacitive sensor mat 10. When a small adult 43 sits on the capacitive occupant sensor 1, there is a low possibility that the small adult 43 sits on the floating electrode 30. When a large adult 42 sits on the capacitive occupant sensor 1, there is a high possibility that the large adult 42 sits on the floating electrode 30. By setting the floating electrode 30 and the cushion member 20 to have the same planar shape as the capacitive sensor mat 10, the capacitive occupant sensor 1 becomes comfortable to sit on.

What is claimed is:

1. A capacitive occupant sensor including a capacitive sensor mat that has a surface and is disposed in a seat cushion of a seat of a vehicle, the capacitive occupant sensor detecting an occupant on the seat based on a capacitance of the capacitive sensor mat, the capacitive occupant sensor comprising:
   a cushion member disposed on the surface of the capacitive sensor mat; and
   a floating electrode disposed on the cushion member and sandwiching the cushion member with the capacitive sensor mat,
   wherein a projected area of the floating electrode with respect to the surface of the capacitive sensor mat is smaller than the surface of the capacitive sensor mat,
   wherein the floating electrode is in an electrically-floating state with respect to the capacitive sensor mat, and
   wherein the occupant is detected based on an occupant capacitance between the capacitive sensor mat and the occupant and a floating capacitance between the capacitive sensor mat and the floating electrode;
   wherein when a center line is defined as a line bisecting the surface of the capacitive sensor mat in a left to right direction of the vehicle and extending in a front to rear direction of the vehicle that is perpendicular to the left to right direction, the cushion member and the floating electrode are disposed above a front portion of the surface of the capacitive sensor mat in the front to rear direction of the vehicle and are disposed above the center line.

2. A capacitive occupant sensor including a capacitive sensor mat that has a surface and is disposed in a seat cushion of a seat of a vehicle, the capacitive occupant sensor detecting an occupant on the seat based on a capacitance of the capacitive sensor mat, the capacitive occupant sensor comprising:
   a cushion member disposed on the surface of the capacitive sensor mat; and
   a floating electrode disposed on the cushion member and sandwiching the cushion member with the capacitive sensor mat,
   wherein a projected area of the floating electrode with respect to the surface of the capacitive sensor mat is smaller than the surface of the capacitive sensor mat,
   wherein the floating electrode is in an electrically-floating state with respect to the capacitive sensor mat, and
   wherein the occupant is detected based on an occupant capacitance between the capacitive sensor mat and the occupant and a floating capacitance between the capacitive sensor mat and the floating electrode;
   wherein when a center line is defined as a line bisecting the surface of the capacitive sensor mat in a left to right direction of the vehicle and extending in a front to rear direction of the vehicle that is perpendicular to the left to right direction, the cushion member and the floating electrode are disposed above a front portion of the surface of the capacitive sensor mat in the front to rear direction of the vehicle and are disposed adjacent to the center line.

3. A capacitive occupant detection apparatus comprising a capacitive occupant sensor including a capacitive sensor mat that has a surface and is disposed in a seat cushion of a seat of a vehicle, the capacitive occupant sensor detecting an occupant on the seat based on a capacitance of the capacitive sensor mat, the capacitive occupant sensor comprising:
   a cushion member disposed on the surface of the capacitive sensor mat;
   a floating electrode disposed on the cushion member and sandwiching the cushion member with the capacitive sensor mat, and
   an occupant detection device,
   wherein a projected area of the floating electrode with respect to the surface of the capacitive sensor mat is smaller than the surface of the capacitive sensor mat,
   wherein the floating electrode is in an electrically-floating state with respect to the capacitive sensor mat,
   wherein the occupant is detected based on an occupant capacitance between the capacitive sensor mat and the occupant and a floating capacitance between the capacitive sensor mat and the floating electrode;
   wherein the occupant detection device has a first threshold value for determining an inflation of an airbag and a second threshold value for determining a kind of the occupant, the second threshold value being larger than the first threshold value, wherein the occupant detection device determines to inflate the airbag when an output of the capacitive occupant sensor is larger than the first threshold value, wherein the occupant detection device determines that the occupant is a small adult when the output of the capacitive occupant sensor is between the first threshold value and the second threshold value, and wherein the occupant detection device determines that the occupant is a large adult when the output of the capacitive occupant sensor is larger than the second threshold value.

4. A capacitive occupant sensor including a capacitive sensor mat that has a surface and is disposed in a seat cushion of a seat of a vehicle, the capacitive occupant sensor detecting an occupant on the seat based on a capacitance of the capacitive sensor mat, the capacitive occupant sensor comprising:

a cushion member disposed on the surface of the capacitive sensor mat; and a floating electrode disposed on the cushion member and sandwiching the cushion member with the capacitive sensor mat;

wherein a projected area of the floating electrode with respect to the surface of the capacitive sensor mat is smaller than the surface of the capacitive sensor mat;

wherein the floating electrode is not electrically coupled with other part of the capacitive occupant sensor and is in an electrically-floating state with respect to the capacitive sensor mat;

wherein the occupant is detected based on an occupant capacitance between the capacitive sensor mat and the occupant and a floating capacitance between the capacitive sensor mat and the floating electrode;

wherein when a center line is defined as a line bisecting the surface of the capacitive sensor mat in a left to right direction of the vehicle and extending in a front to rear direction of the vehicle that is perpendicular to the left to right direction, the cushion member and the floating electrode are disposed above a front portion of the surface of the capacitive sensor mat in the front to rear direction of the vehicle and are disposed above the center line.

5. A capacitive occupant sensor including a capacitive sensor mat that has a surface and is disposed in a seat cushion of a seat of a vehicle, the capacitive occupant sensor detecting an occupant on the seat based on a capacitance of the capacitive sensor mat, the capacitive occupant sensor comprising:

a cushion member disposed on the surface of the capacitive sensor mat; and a floating electrode disposed on the cushion member and sandwiching the cushion member with the capacitive sensor mat;

wherein a projected area of the floating electrode with respect to the surface of the capacitive sensor mat is smaller than the surface of the capacitive sensor mat;

wherein the floating electrode is not electrically coupled with other part of the capacitive occupant sensor and is in an electrically-floating state with respect to the capacitive sensor mat;

wherein the occupant is detected based on an occupant capacitance between the capacitive sensor mat and the occupant and a floating capacitance between the capacitive sensor mat and the floating electrode;

wherein when a center line is defined as a line bisecting the surface of the capacitive sensor mat in a left to right direction of the vehicle and extending in a front to rear direction of the vehicle that is perpendicular to the left to right direction, the cushion member and the floating electrode are disposed above a front portion of the surface of the capacitive sensor mat in the front to rear direction of the vehicle and are disposed adjacent to the center line.

* * * * *